US010954981B2

(12) United States Patent
Miller

(10) Patent No.: US 10,954,981 B2
(45) Date of Patent: Mar. 23, 2021

(54) RADIAL EXPANSION COUPLING DEVICE

(71) Applicant: Raytheon Company, Waltham, MA (US)

(72) Inventor: Brett A. Miller, McKinney, TX (US)

(73) Assignee: Raytheon Company, Waltham, MA (US)

( * ) Notice: Subject to any disclaimer, the term of this patent is extended or adjusted under 35 U.S.C. 154(b) by 321 days.

(21) Appl. No.: 15/905,736

(22) Filed: Feb. 26, 2018

(65) Prior Publication Data
US 2019/0264720 A1  Aug. 29, 2019

(51) Int. Cl.
| | |
|---|---|
| *F16B 13/04* | (2006.01) |
| *F16B 13/08* | (2006.01) |
| *F16B 2/04* | (2006.01) |
| *F16B 13/12* | (2006.01) |
| *F16B 5/02* | (2006.01) |

(Continued)

(52) U.S. Cl.
CPC ........... *F16B 13/0816* (2013.01); *F16B 2/04* (2013.01); *F16B 2/14* (2013.01); *F16B 5/0258* (2013.01); *F16B 5/0642* (2013.01); *F16B 13/045* (2013.01); *F16B 13/0825* (2013.01); *F16B 13/124* (2013.01)

(58) Field of Classification Search
CPC .... F16B 13/0816; F16B 13/0891; F16B 2/04; F16B 2/14; F16B 5/0258; F16B 13/045
USPC ................................. 411/24, 25, 28
See application file for complete search history.

(56) References Cited

U.S. PATENT DOCUMENTS

| | | | | |
|---|---|---|---|---|
| 683,082 | A | * | 9/1901 | Summerer |
| 1,922,099 | A | * | 8/1933 | Kilian ................. B60B 33/0002 16/38 |

(Continued)

FOREIGN PATENT DOCUMENTS

| | | |
|---|---|---|
| CN | 205025890 U | 2/2016 |
| DE | 2402428 A1 | 8/1974 |
| JP | 55362057 A | 6/1978 |

OTHER PUBLICATIONS

International Search Report for International Application No. PCT/US2018/067559 dated Apr. 16, 2019, 16 pages.

*Primary Examiner* — Gary W Estremsky

(57) ABSTRACT

A radial expansion system for a fastener is disclosed. The radial expansion system can include a plurality of wedge guides. Each wedge guide can have at least one guide surface. The plurality of wedge guides can be operable to be movably arranged along an axis with the guide surfaces of adjacent wedge guides opposing one another. The radial expansion system can also include a plurality of expansion wedges. Each expansion wedge can have wedge surfaces configured to slidingly interface with the at least one guide surface. Each expansion wedge can also have a clamp surface operable to interface with an interior portion of a first component. The plurality of expansion wedges can be operable to be disposed between adjacent wedge guides such that the wedge surfaces interface with the opposing guide surfaces. A second component and the plurality of wedge guides can be operable to be drawn toward one another by a fastener to cause the plurality of expansion wedges to displace radially outward from the axis such that the clamping surfaces engage and apply a clamping force to the interior portion of the first component, and thereby couple the first and second components to one another.

26 Claims, 6 Drawing Sheets

(51) Int. Cl.
*F16B 5/06* (2006.01)
*F16B 2/14* (2006.01)

(56) References Cited

U.S. PATENT DOCUMENTS

| | | | | |
|---|---|---|---|---|
| 2,433,617 | A | | 12/1947 | Marsilius |
| 2,573,928 | A | * | 11/1951 | Peter ................... B23B 31/1177 279/2.11 |
| 3,009,747 | A | * | 11/1961 | Pitzer ...................... F16D 1/094 384/272 |
| 3,192,820 | A | * | 7/1965 | Pitzer ................... F16B 13/065 411/33 |
| 3,373,648 | A | | 3/1968 | Pitzer |
| 3,603,626 | A | | 9/1971 | Whiteside |
| 4,059,036 | A | * | 11/1977 | Hartley ................... B23D 21/14 83/188 |
| 4,120,586 | A | * | 10/1978 | Lessner ................. F16B 13/068 248/219.2 |
| 4,507,034 | A | * | 3/1985 | Lew ........................ F16B 39/02 24/607 |
| 4,647,262 | A | | 3/1987 | Yokota |
| 4,946,325 | A | * | 8/1990 | Abraham .............. F16B 13/124 411/24 |
| 5,074,536 | A | * | 12/1991 | McConkey ............ B23Q 3/183 269/43 |
| 8,511,133 | B1 | * | 8/2013 | Chen .................... B21D 41/028 269/43 |

\* cited by examiner

RADIAL EXPANSION COUPLING DEVICE

GOVERNMENT LICENSE RIGHTS

This invention was made with government support. The government has certain rights in the invention.

BACKGROUND

All bolted interfaces have tolerance mismatches and misalignments. Traditional bolted joints clamp these interfaces together, which forces the mismatched surfaces together and causes distortion in both parts. Part distortion is especially problematic for mounting optics, as bolted joint deformation can cause a significant reduction in image quality. To mount optics under severe environmental conditions (e.g., in a high vibration environment), a rigid joint is needed that does not stress or distort the optic. To achieve a stress or distortion free rigid joint, traditional bolts have been utilized and assembled with low preload to avoid part distortion. Adhesive mounting has also been utilized as a bolt substitute to achieve a stress or distortion free rigid joint.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
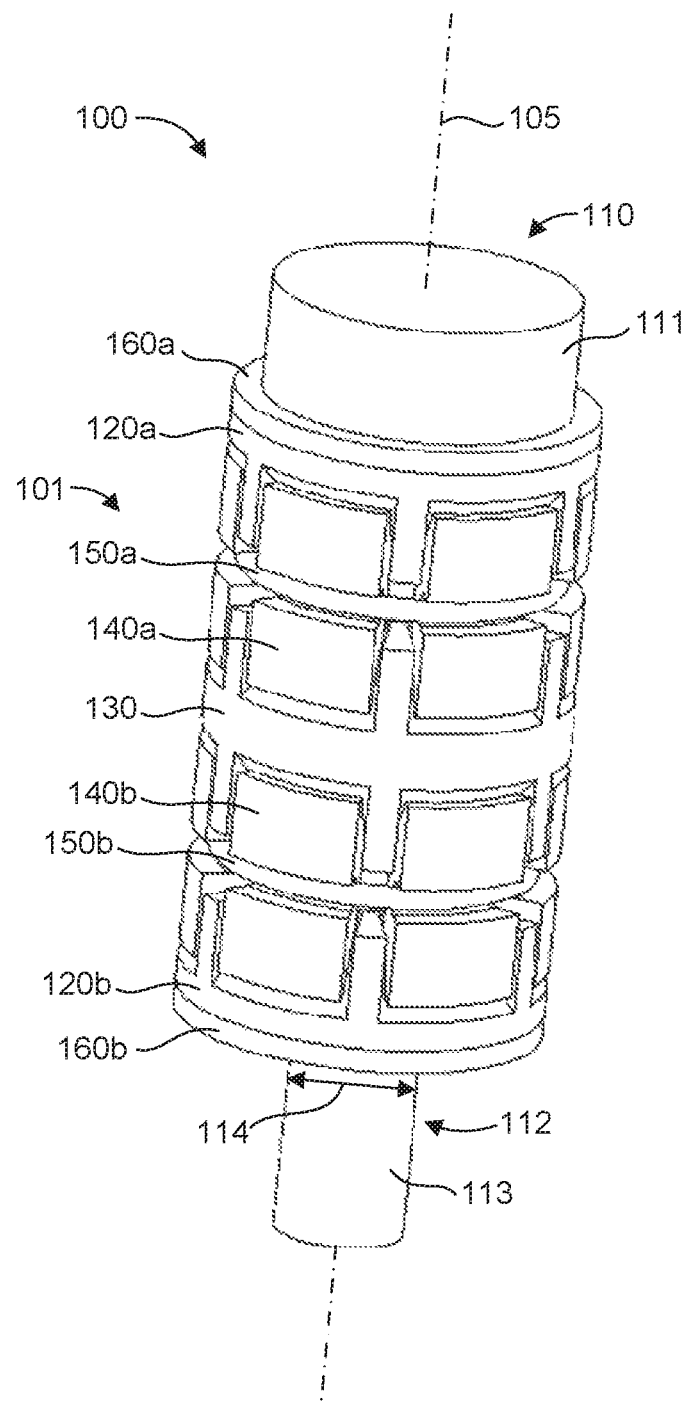
FIG. 1 is an illustration of a radial expansion coupling device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although joints have been assembled with the objective of achieving stress or distortion free rigid joints, the techniques used leave something to be desired. Traditional bolts assembled with low preload create joints that are susceptible to slip and may not provide a desired level of stiffness, which can be detrimental for alignment and jitter in an optical system application. Additionally, adhesive mounting may not provide the desired joint stability in some operating environments (e.g., a space-based optical system). Liquid pinning/adhesive mounting can also cause wavefront error due to coefficient of thermal expansion (CTE) mismatch with the joint components. In addition, liquid pinning/adhesive mounting is not easily reworked if disassembly is desired. Thus, there is a need for a coupling system that can provide a stress or distortion free rigid joint and that also facilitates disassembly of the joint.

Accordingly, a radial expansion system for a fastener is disclosed that provides a rigid joint, which is stress or distortion free. In one aspect, a joint formed with the radial expansion system can be easily disassembled. The radial expansion system can include a plurality of wedge guides. Each wedge guide can have at least one guide surface. The plurality of wedge guides can be operable to be movably arranged along an axis with the guide surfaces of adjacent wedge guides opposing one another. The radial expansion system can also include a plurality of expansion wedges. Each expansion wedge can have wedge surfaces configured to slidingly interface with the at least one guide surface. Each expansion wedge can also have a clamp surface operable to interface with an interior portion of a first component. The plurality of expansion wedges can be operable to be disposed between adjacent wedge guides such that the wedge surfaces interface with the opposing guide surfaces. A second component and the plurality of wedge guides can be operable to be drawn toward one another by a fastener to cause the plurality of expansion wedges to displace radially outward from the axis such that the clamping surfaces engage and apply a clamping force to the interior portion of the first component, and thereby couple the first and second components to one another.

A radial expansion coupling system is also disclosed. The radial expansion coupling system can include first and second components, and a radial expansion coupling device operably coupling the first and second components to one another. The radial expansion coupling device can include a displacement mechanism, and a radial expansion system. The radial expansion system can have a plurality of wedge guides. Each wedge guide can have at least one guide surface. The plurality of wedge guides can be movably arranged along an axis with the guide surfaces of adjacent wedge guides opposing one another. The radial expansion system can also have a plurality of expansion wedges. Each expansion wedge can have wedge surfaces configured to slidingly interface with the at least one guide surface. Each expansion wedge can also have a clamp surface operable to interface with an interior portion of the first component. The plurality of expansion wedges can be disposed between adjacent wedge guides such that the wedge surfaces interface with the opposing guide surfaces. The displacement mechanism can be operable to draw the second component and the plurality of wedge guides toward one another to cause the plurality of expansion wedges to displace radially outward from the axis. The clamping surfaces can engage and apply a clamping force to the interior portion of the first component, thereby coupling the first and second components to one another.

Figure 2:
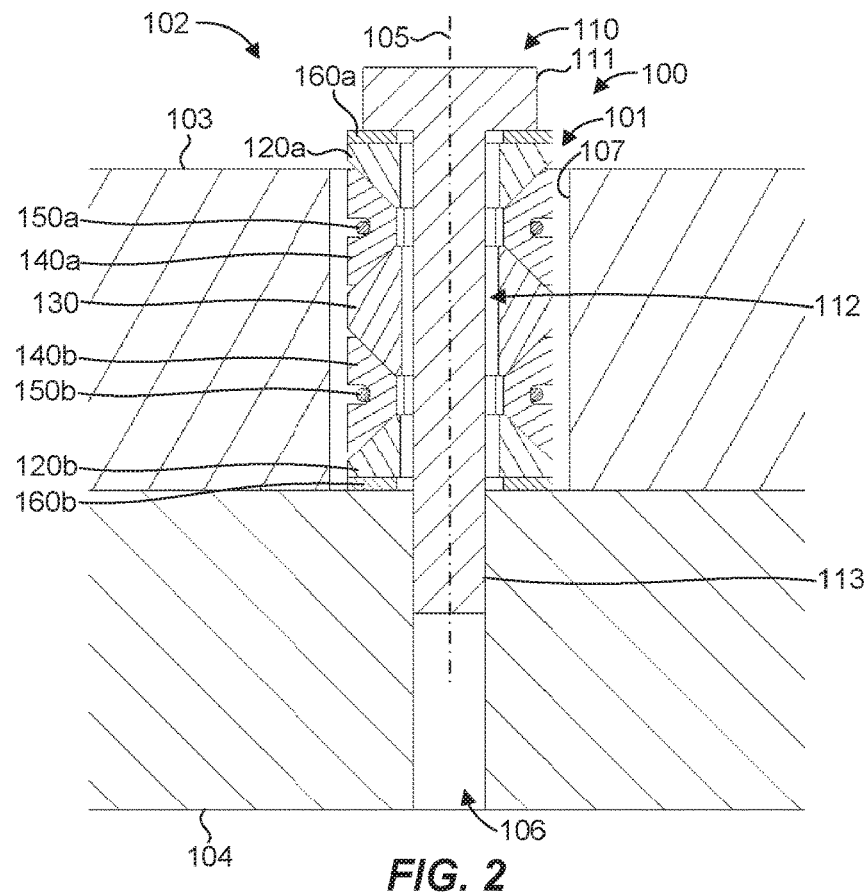
FIG. 2 is an illustration of the radial expansion coupling device of FIG. 1 in a disengaged configuration, in accordance with an example of the present disclosure.
Figure 3:
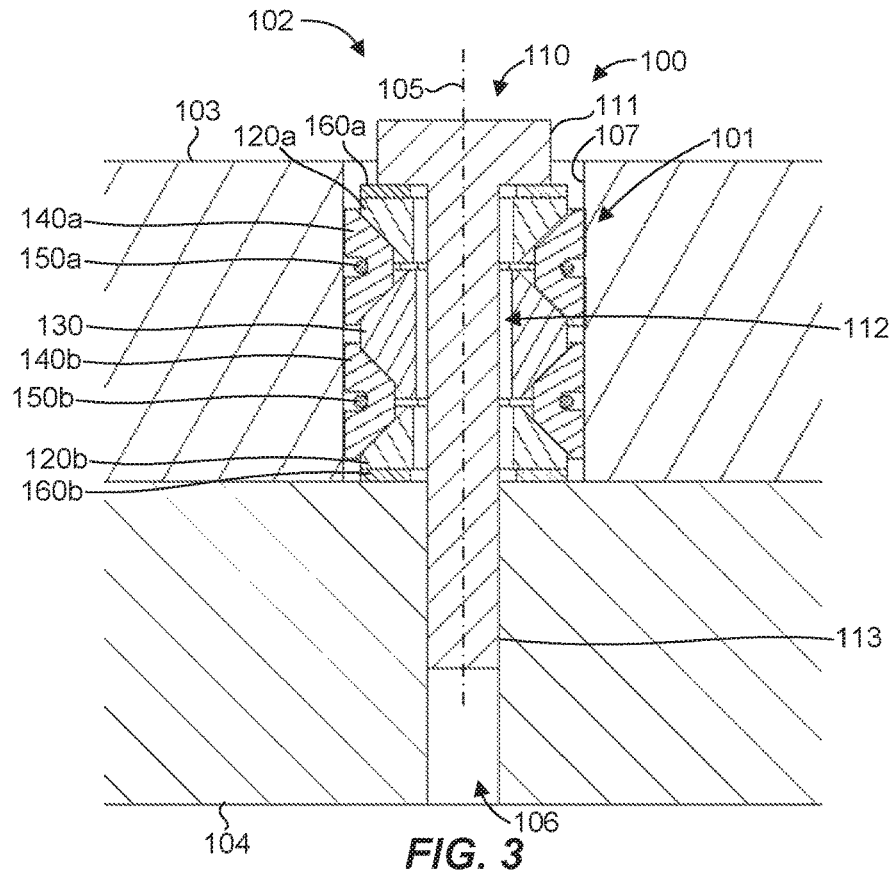
FIG. 3 is an illustration of the radial expansion coupling device of FIG. 1 in an engaged configuration, in accordance with an example of the present disclosure.

To further describe the present technology, examples are now provided with reference to the figures. With reference to FIG. 1, one embodiment of a radial expansion coupling device 100 is illustrated. The radial expansion coupling device 100 can comprise a radial expansion system 101 and a displacement mechanism 110. FIGS. 2 and 3 show a radial expansion coupling system 102, which includes the radial expansion coupling device 100 in the context of coupling two components 103, 104 to one another. FIG. 2 shows a disengaged configuration of the radial expansion coupling device 100. FIG. 3 shows an engaged configuration of the radial expansion coupling device 100.

It is noted that the components 103, 104 are shown generically and can represent any two components that may be coupled (e.g., fastened, bolted, screwed, welded, glued, riveted, etc.) to one another utilizing the radial expansion coupling technology discussed herein. The components 103, 104 can be aligned, or in some cases they can be misaligned (e.g., such as may be the case in some aircraft or automotive couplings, or that can occur when mounting adjustable rails of an equipment rack, and others). Misalignment of the components 103, 104 can occur due to a variety of factors, such as due to poor manufacturing, very large dimensions, welding errors, blind mating, and others. Furthermore, in one example, the radial expansion coupling technology discussed herein can be used to join components 103, 104 that are parts in an optical system, such as a mirror and a support structure or mount for the mirror. In another example, the radial expansion coupling technology discussed herein can be used to join components 103, 104 that are part of a power transmission of misaligned shafts (e.g., coupling, clutch). In another example, the radial expansion coupling technology discussed herein can be used to lock out and constrain two components 103, 104 with active relative motion, such as in six degrees of freedom (e.g., lock out a vibration isolator), In another example, the radial expansion coupling technology discussed herein can be used as an additional attachment point for an already fully constrained part comprising first and second components 103, 104, wherein the additional attachment point provided will not over constrain the part. The radial expansion coupling technology discussed herein could provide a temporary constraint on a rotating part on precision hinges or bearings (e.g., a stop on a switching mechanism). In another example, the radial expansion coupling technology discussed herein can be used as a rigid joint which thermally isolates first and second components 103, 104. Traditional bolted joints clamp mating interfaces together, which creates a conduction path for the transfer of heat. Utilizing the radial expansion coupling technology discussed herein, two components 103, 104 together can be coupled together while maintaining an air gap between them, which will thermally isolate the components 103, 104 from each other (e.g., can be used to thermally isolate electronics or circuit cards). Still other possible uses and applications will be apparent to those skilled in the art. As such, those presented herein are not intended to be limiting in any way.

In general, a radial expansion system as disclosed herein (e.g., the radial expansion system 101) includes two or more wedge guides and two or more expansion wedges. In the embodiment illustrated in FIGS. 1-3, the radial expansion system 101 includes end wedge guides 120a, 120b and an intermediate wedge guide 130. Expansion wedges 140a are disposed between the end wedge guide 120a and the intermediate wedge guide 130, and expansion wedges 140b are disposed between the end wedge guide 120b and the intermediate wedge guide 130. The radial expansion system 101 can also include one or more springs 150a, 150b associated with the respective expansion wedges 140a, 140b to hold the expansion wedges captive about the wedge guides when not in use, such as by biasing the expansion wedges 140a, 140b radially inward toward a central axis 105 of the radial expansion coupling device 100. In other words, the radial expansion system 101 can be spring-loaded to hold the expansion wedges 140a, 140b captive and contract the radial expansion system 101 when in the disengaged configuration.

The displacement mechanism 110 can extend through and be coupled to the radial expansion system 101. In the illustrated embodiment, the displacement mechanism 110 comprises an engagement portion 111 configured to engage and couple with the end wedge guide 120a (e.g., via a washer or spacer 160a disposed between the engagement portion 111 and the end wedge guide 120a). The displacement mechanism 110 can include an elongate body portion 112 configured to extend through the radial expansion system 101. The displacement mechanism 110 can also be coupled to the component 104, such as by interfacing the elongate body 112 with coupling features of a mounting hole or opening 106. A washer or spacer 160b can be disposed between the end wedge guide 120b and the component 104. The displacement mechanism 110 can be operable to displace the wedge guides 120a, 120b, 130 and the component 104 toward one another to cause radially outward displacement of the expansion wedges 140a, 140b and facilitate coupling the components 103, 104 to one another. In so doing, an axial load can be generated in the displacement mechanism 110 to cause the relative displacements of the various components. Once the radial expansion coupling device 100 is engaged, as in FIG. 3, the axial load in the displacement mechanism 110 can be increased to a suitable preload value for the application.

The displacement mechanism 110 can be coupled to the radial expansion system 101 (e.g., the end wedge guide 120a) and to the component 104 in any suitable manner, such as by one or more connections that facilitate relative movement (e.g., a threaded engagement, a rotational engagement, etc.) and/or a fixed connection (e.g., welded, pinned, clamped, glued, etc.). In the illustrated embodiment, the engagement portion 111 of the displacement mechanism 110 comprises a head (e.g., having a flange configuration), and the elongate body 112 can extend from the head. The engagement portion 111 head can be configured as a typical head of a threaded fastener (e.g., a bolt or a screw), and the elongate body 112 can be configured as a typical shank of a threaded fastener. Thus, in some embodiments, the displacement mechanism 110 can comprise a screw thread (e.g., on the elongate body 112 at 113) to couple the displacement mechanism 110 to the component 104 (e.g., via a threaded hole). As an alternative, in some embodiments the head or engagement portion 111 of the displacement mechanism 110 can interface with or engage the component 104, and the displacement mechanism 110 can have a threaded engagement with the radial expansion system 101 (e.g., via a threaded hole in the end wedge guide 120a).

A displacement mechanism in accordance with the present disclosure can include any suitable component or components utilized in any combination, such as a threaded fastener (e.g., a screw, a bolt, a nut, etc.), a cam mechanism (e.g., a lever-actuated cam operable with a shaft or rod extending between and connecting the end wedge guide 120a and the component 104), a Bowden cable, etc. In the illustrated embodiment, the displacement mechanism 110 comprises a screw, but this is not meant to be limiting in any way. In some embodiments, a displacement mechanism can comprise a threaded rod operable to engage with one or more nuts to facilitate coupling with the radial expansion system 101 and the component 104.

Figure 4:
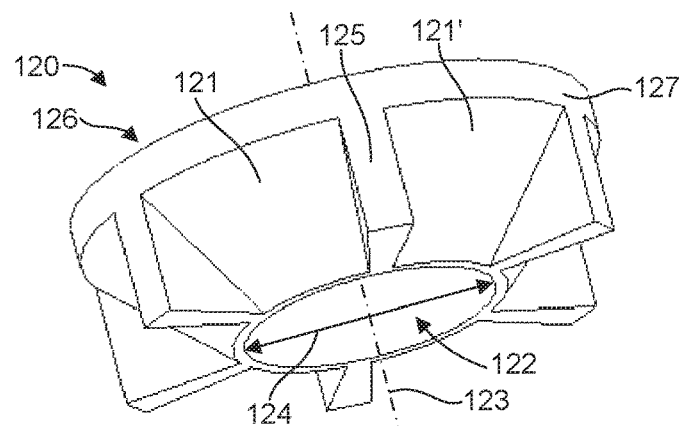
FIG. 4 is an illustration of an end wedge guide of the radial expansion coupling device of FIG. 1, in accordance with an example of the present disclosure.
Figure 5:
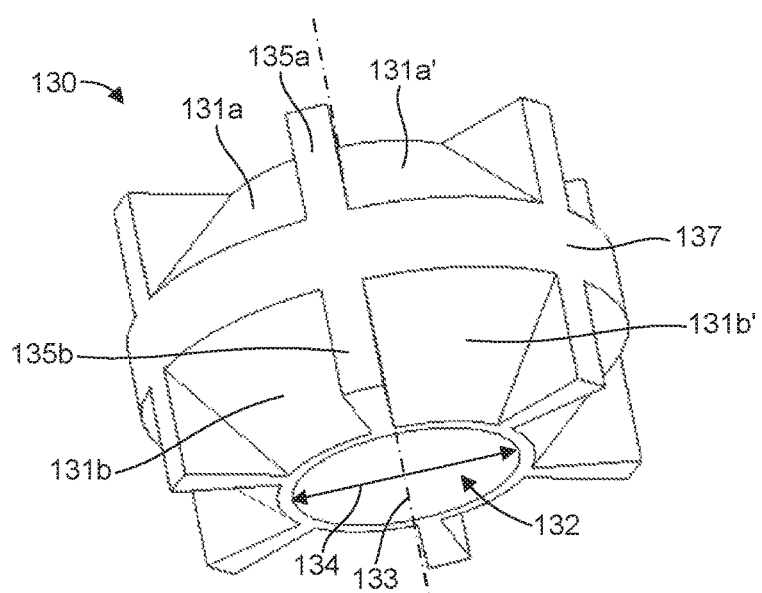
FIG. 5 is an illustration of an intermediate wedge guide of the radial expansion coupling device of FIG. 1, in accordance with an example of the present disclosure.
Figure 6A:
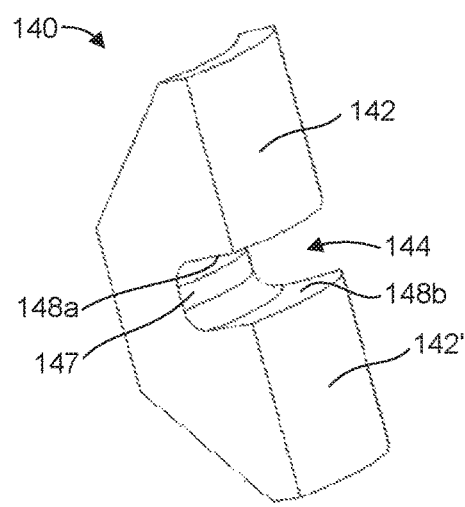
FIGS. 6A and 6B are illustrations of an expansion wedge of the radial expansion coupling device of FIG. 1, in accordance with an example of the present disclosure.
Figure 6B:
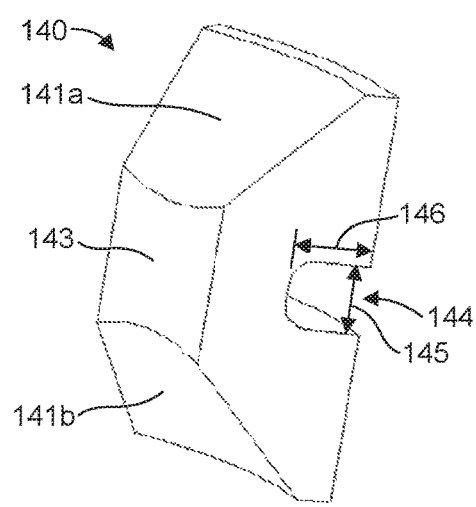

With continued reference to FIGS. 1-3, FIGS. 4-6B show various components of the radial expansion system 101 in isolation. FIG. 4 shows an end wedge guide 120 (e.g., generically representing the end wedge guides 120a, 120b), FIG. 5 shows the intermediate wedge guide 130, and FIGS. 6A and 6B show an expansion wedge 140 (e.g., generically representing the expansion wedges 140a, 140b) of the radial expansion system 101.

With reference to FIG. 4, the end wedge guide 120 can have at least one guide surface 121, 121' configured to slidingly interface with the expansion wedge 140. In the illustrated embodiment, the guide surface 121, 121' has a conical configuration or, in other words, is defined by an outer surface of a cone. It should be recognized that a guide surface can have any suitable configuration (e.g., a planar configuration) that can facilitate radially outward/inward movement of an expansion wedge interfacing with the guide surface.

In one aspect, the guide surface 121, 121' can have any suitable surface characteristic. In some embodiments, the guide surface 121, 121' can be smooth. In some embodiments, the guide surface 121, 121' can include surface features that provide a relatively low coefficient of friction, such as a polished surface finish, protrusions (e.g., pebbling, spherical bumps, etc.), or any other suitable friction reducing or minimizing feature. In one aspect, the guide surface 121, 121' can be constructed of the same or a different material than other portions of the end wedge guide 120. In some embodiments, the guide surface 121, 121' can include a material configured to provide a relatively low coefficient of friction and/or non-adhesive properties (e.g., a PTFE layer or coating).

The end wedge guide 120 can include a central opening 122 operable to receive at least a portion of the displacement mechanism 110 (e.g., the elongate body 112 or shank of a fastener) therethrough. As shown in FIG. 2, for example, the end wedge guides 120a, 120b can be in a stacked arrangement with the displacement mechanism 110 extending through the central openings. The central opening 122 can have an axis 123, which can be oriented parallel to or collinear with the central axis 105. In one aspect, a diameter 124 of the central opening 122 can be sized relative to an outer diameter 114 (FIG. 1) of the displacement mechanism 110 (e.g., the elongate body 112) to allow lateral movement and/or rotation of the end wedge guide 120 relative to the displacement member 110.

In some embodiments, guide surfaces 121, 121' can be separated from one another by one or more guide walls 125, which can serve to separate adjacent expansion wedges 140 from one another. The guide walls 125 can be configured to maintain the expansion wedges 140 in a suitable relationship and orientation for effective outward/inward radial movement. In one aspect, the guide walls 125 can be configured to be radially oriented relative to the central axis 105 (e.g., by being radially oriented relative to the axis 123 of the central opening 122).

The end wedge guide 120 can also include an outer interface surface 126 configured to facilitate engagement with the displacement mechanism 110 and/or the component 104. The outer interface surface 126 can have any suitable configuration or attribute. In some embodiments, the outer interface surface 126 comprises a planar or flat configuration. In the embodiment illustrated in FIG. 2, an outer interface surface of the end wedge guide 120a can be configured to interface with the washer or spacer 160a, which is disposed between the head 111 of the displacement mechanism 110 and the end wedge guide 120a. An outer interface surface of the end wedge guide 120b can be configured to interface with the washer or spacer 160b, which is disposed between a surface of the component 104 and the end wedge guide 120b.

An outer boundary surface 127 of the end wedge guide 120 can be sized and configured to facilitate insertion of the end wedge guide 120 into a clearance hole or attachment opening defined by an interior portion 107 of the component 103 (FIGS. 2 and 3).

With reference to FIG. 5, the intermediate wedge guide 130 can have at least one guide surface 131, 131' configured to slidingly interface with expansion wedges 140 on opposite sides of the intermediate wedge guide 130. For example, the intermediate wedge guide 130 can have guide surfaces 131a, 131a' configured to slidingly interface with an expansion wedge (e.g., the expansion wedge 140a as shown FIGS. 1-3). The intermediate wedge guide 130 can also have guide surfaces 131b, 131b' configured to slidingly interface with an expansion wedge (e.g., the expansion wedge 140b as shown FIGS. 1-3). In the illustrated embodiment, the guide surface 131a, 131a' and the guide surface 131b, 131b' have a conical configuration or, in other words, are defined by an outer surface of a cone. It should be recognized that a guide surface of the intermediate wedge guide 130 can have the same or a different configuration than a guide surface of an end wedge guide 120, and the expansion wedges 140 (discussed in more detail below) can be configured accordingly or vice versa.

In one aspect, the guide surfaces 131a, 131a', 131b, 131b' can have any suitable surface characteristic. In some embodiments, one or more of the guide surfaces 131a, 131a', 131b, 131b' can be smooth. In some embodiments, one or more of the guide surfaces 131a, 131a', 131b, 131b' can include surface features that provide a relatively low coefficient of friction, such as a polished surface finish, protrusions (e.g., pebbling, spherical bumps, etc.), or any other suitable friction reducing or minimizing feature. In one aspect, one or more of the guide surfaces 131a, 131a', 131b, 131b' can be constructed of the same or a different material than other portions of the intermediate wedge guide 130. In some embodiments, one or more of the guide surfaces 131a, 131a', 131b, 131b' can include a material configured to provide a relatively low coefficient of friction and/or non-adhesive properties (e.g., a PTFE layer or coating).

The intermediate wedge guide 130 can include a central opening 132 operable to receive at least a portion of the displacement mechanism 110 (e.g., an elongate body or shank of a fastener) therethrough. As shown in FIG. 2, for example, the intermediate wedge guide 130 can be stacked between the end wedge guides 120a, 120b with the displacement mechanism 110 extending through the central openings of the wedge guides. The central opening 132 can have an axis 133, which can be oriented parallel to or collinear with the central axis 105. In one aspect, a diameter 134 of the central opening 132 can be sized relative to the outer diameter 114 (FIG. 1) of the displacement mechanism 110 (e.g., the elongate body 112) to allow lateral movement and/or rotation of the intermediate wedge guide 130 relative to the displacement member 110.

In some embodiments, guide surfaces 131a, 131a' and/or guide surfaces 131b, 131b' can be separated from one another by one or more guide walls 135a, 135b, respectively, which can serve to separate adjacent expansion wedges from one another. The guide walls 135a, 135b can be configured to maintain the expansion wedges in a suitable relationship and orientation for effective outward/inward radial movement. In one aspect, the guide walls 135a, 135b can be configured to be radially oriented relative to the central axis 105 (e.g., by being radially oriented relative to the axis 133 of the central opening 132).

An outer boundary surface 137 of the intermediate wedge guide 130 can be sized and configured to facilitate insertion of the intermediate wedge guide 130 into a clearance hole or attachment opening defined by the interior portion 107 of the component 103 (FIGS. 2 and 3).

With reference to FIGS. 6A and 6B the expansion wedge 140 can have wedge surfaces 141a, 141b configured to slidingly interface with guide surfaces of the wedge guides. In the illustrated embodiment, the wedge surfaces 141a, 141b have a conical configuration or, in other words, are defined by an outer surface of a cone. It should be recognized that a wedge surface can have any suitable configuration (e.g., a planar configuration) that can facilitate radially outward/inward movement of the expansion wedge 140 interfacing with guide surfaces of wedge guides. It should also be recognized that the wedge surface 141a can have the same or a different configuration than the wedge surface 141b so long as the wedge surfaces are configured to slidingly interface with a given guide surface of a wedge guide.

The expansion wedge 140 can also include a clamp surface 142, 142' operable to interface with the interior portion 107 (e.g., a sidewall of a clearance hole or attachment opening) of the component 103 (FIGS. 2 and 3). In the illustrated embodiment, the clamp surface 142, 142' can have a curved configuration defined at least partially by a radius, which can be the same or a similar radius of a clearance hole or attachment opening in the component 103. In some embodiments, the clamp surface 142, 142' can be defined at least partially by a surface of a cylinder, which can be the same or similar geometry as a cylindrical clearance hole or attachment opening in the component 103. It should be recognized that a clamp surface can have any suitable configuration (e.g., a curved and/or planar configuration) that can facilitate interfacing and engagement of the expansion wedge 140 with some feature (e.g., a sidewall of a clearance hole or attachment opening) of the component 103.

In one aspect, the clamp surface 142, 142' can have any suitable surface characteristic. In some embodiments, the clamp surface 142, 142' can be smooth. In some embodiments, the clamp surface 142, 142' can include surface features that provide a relatively high coefficient of friction, such as a rough surface finish, protrusions (e.g., knurling, pebbling, spikes, grooves, ridges, etc.), or any other suitable friction enhancing feature. In one aspect, the clamp surface 142, 142' can be constructed of the same or a different material than other portions of the expansion wedge 140. In some embodiments, the clamp surface 142, 142' can include a material configured to provide a relatively high coefficient of friction and/or adhesive properties (e.g., an elastomeric polymer layer or coating).

The expansion wedge 140 can include an inner side surface 143 operable to be disposed about at least a portion of the displacement mechanism 110 (e.g., an elongate body or shank of a fastener). As shown in FIG. 2, for example, the end wedge guides 120a, 120b and intermediate wedge guide 130 can be movably arranged along the central axis 105 with the displacement mechanism 110 extending through the central openings of the wedge guides. The wedge guides can be arranged such that the guide surfaces of adjacent wedge guides oppose one another. In particular, the intermediate wedge guide 130 has guide surfaces configured to oppose the guide surfaces of wedge guides disposed on opposite sides of the intermediate wedge guide, in this case, the end wedge guides 120a, 120b. The expansion wedges 140a, 140b are disposed about the displacement mechanism 110 and between adjacent wedge guides such that the wedge surfaces interface with the opposing guide surfaces. In particular, the expansion wedges 140a are disposed between the end wedge guide 120a and the intermediate wedge guide 130. The expansion wedges 140b are disposed between the end wedge guide 120b and the intermediate wedge guide 130. The expansion wedges 140 can therefore be configured to fit around or about the displacement mechanism 110 for assembly within a clearance hole or attachment opening in the component 103 and to move into engagement with a sidewall of the clearance hole or attachment opening in the component 103 sufficient to clamp the component 103.

It should be recognized that in some embodiments a radial expansion system can include only two end wedge guides omitting an intermediate wedge guide, and in other embodiments, a radial expansion system can include two end wedge guides and multiple intermediate wedge guides. Thus, although only a single intermediate wedge guide 130 is shown in FIGS. 1-3, it should be recognized that a radial expansion system as disclosed herein can include any number of intermediate wedge guides disposed between end wedges guides. When multiple intermediate wedge guides 130 are utilized, expansion wedges can be disposed between each of the intermediate wedge guides as well as between intermediate wedge guides and end wedge guides.

In one aspect, the expansion wedge 140 can include a spring seat 144 configured to interface with a spring (e.g., the springs 150a, 150b in FIGS. 1-3) to maintain or hold the spring proximate the expansion wedge 140 throughout a range of motion of the expansion wedge during use. The spring seat 144 can have any suitable configuration to interface with the spring. In the illustrated embodiment, the spring seat 144 can define a recess with a width 145 and a depth 146 sized to receive at least a portion of the spring. The spring seat 144 can include an inner interface surface 147 and side interface surfaces 148a, 148b that can be configured to interface with the spring and maintain the spring at least partially within the recess defined by the spring seat 144.

As shown in the disengaged configuration of FIG. 2, the springs 150a, 150b can hold the expansion wedges 140a, 140b captive. The springs 150a, 150b can be preloaded to provide a radially inward retraction force that maintains the radial expansion coupling device 100 retracted (e.g., the expansion wedges 140a, 140b forced against the wedge guides 120a, 120b, 130) when axial load is not applied by the displacement mechanism 110. In this configuration, the radial expansion coupling device 100 can fit within the interior portion 107 of the component 103. The springs 150a, 150b can have any suitable configuration and can be constructed of any suitable material, such as a garter spring (e.g. made of steel) an elastic band (e.g., made of an elastomer), etc.

Operation or actuation of the displacement mechanism 110 in one direction can move or draw the component 104 and the wedge guides 120a, 120b, 130 toward one another, which can apply force to the expansion wedges 140a, 140b. As a result, the expansion wedges 140a, 140b can be caused to displace radially outward from the central axis 105 (e.g., slide along the wedge guides 120a, 120b, 130) such that the expansion wedges 140a, 140b engage and apply a radial clamping force to the interior portion 107 of the component 103 and thereby couple the components 103, 104 to one another, as shown in FIG. 3. On the other hand, facilitating movement of the wedge guides 120a, 120b, 130 away from one another (e.g., by actuation of the displacement mechanism 110 in an opposite direction to reduce or eliminate axial loading) can enable displacement of the expansion wedges 140a, 140b radially inward toward the central axis 105 sufficient to disengage the interior portion 107 of the component 103. Such inward movement of the expansion wedges 140a, 140b can be caused at least in part by the springs 150a, 150b.

The displacement mechanism 110 can perform at least two basic functions. When engaging, the displacement mechanism 110 can provide enough axial displacement to close the radial gap between the expansion wedges 140a, 140b (e.g., wedge surfaces 142) and the interior portion 107 (e.g., clearance hole surfaces). The displacement mechanism 110 can also provide adequate axial preload for a given application such that the expansion wedges 140a, 140b (e.g., wedge surfaces 142) clamp to the interior portion 107 (e.g., clearance hole surfaces) with enough radial preload.

It should be recognized that each of the expansion wedges 140a, 140b and the wedge guides 120a, 120b, 130 can be free to move relative to one another and find its own seat as the expansion wedges 140a, 140b contact the interior portion 107 of the component 103. The segmented design configuration of the radial expansion coupling device 100, which allows relative motion between each expansion wedge 140a, 140b and wedge guide 120a, 120b, 130, can enable each expansion wedge to find its lowest stress seat between the wedge guides and the interior portion 107 of the component 103. Axial stiffness of the radial expansion coupling device 100 is extremely low prior to the expansion wedges 140a, 140b making contact with the interior portion 107 of the component 103. Once the expansion wedges 140a, 140b make contact with the interior portion 107 of the component 103 and find their seats, axial stiffness increases by many orders of magnitude. The flexibility in the radial expansion coupling device 100 can conform and adapt to different part geometries to accommodate tolerance mismatches (e.g., in the clearance hole, mating surfaces, fastener head and thread, etc.) before radial preload in the radial expansion coupling device 100 is applied by the displacement mechanism 110. For example, when coupling the components 103, 104 together, the radial expansion coupling device 100 can "self-center" to take up positional tolerances between mounting features (e.g., the interior portion 107 or clearance hole and the mounting hole or opening 106).

Figure 7:
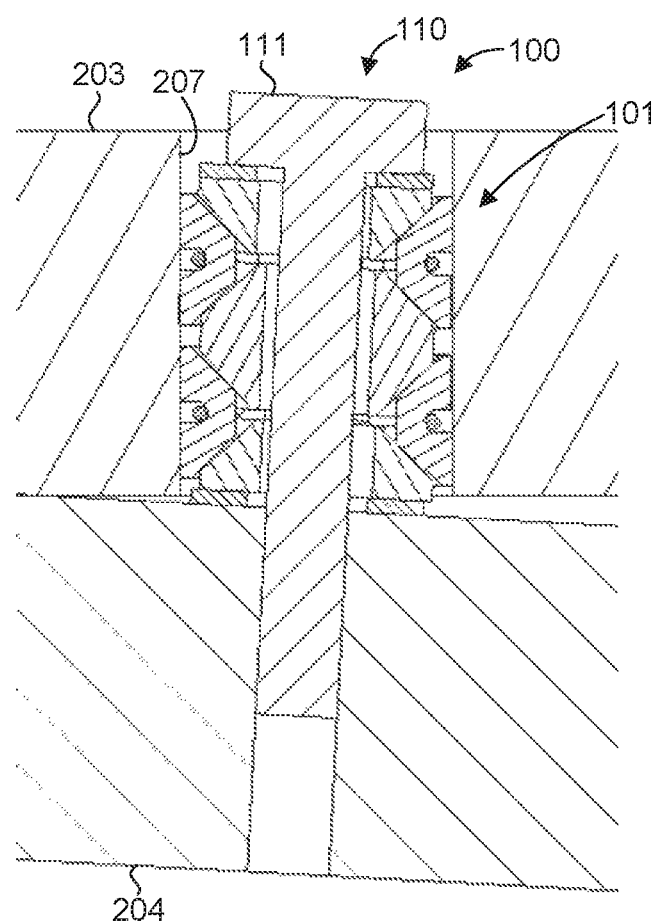
FIG. 7 is an illustration of the radial expansion coupling device of FIG. 1 coupling misaligned components, in accordance with an example of the present disclosure.

The radial expansion coupling device 100 can also provide for rigid clamping or coupling of highly misaligned parts without distorting the parts. As illustrated in FIG. 7, the radial expansion system 101 can tilt and move (e.g., in rigid body) to match a misalignment of an interior portion 207 defining a clearance hole of a component 203. For example, the radial expansion system 101 can conform to an angle of the engagement portion 111 or head of the displacement mechanism 110 when seating. The radial expansion system 101 can also conform to a local angle of the interior portion 207 or clearance hole, as well as conform to an angle of mating surfaces when seating. The multiple "segments" (e.g., wedge guides and expansion wedges) of the radial expansion coupling device 100 are free to find their own seats, which can provide low stress mounting of components 203, 204 with misaligned interfaces.

Figure 8:
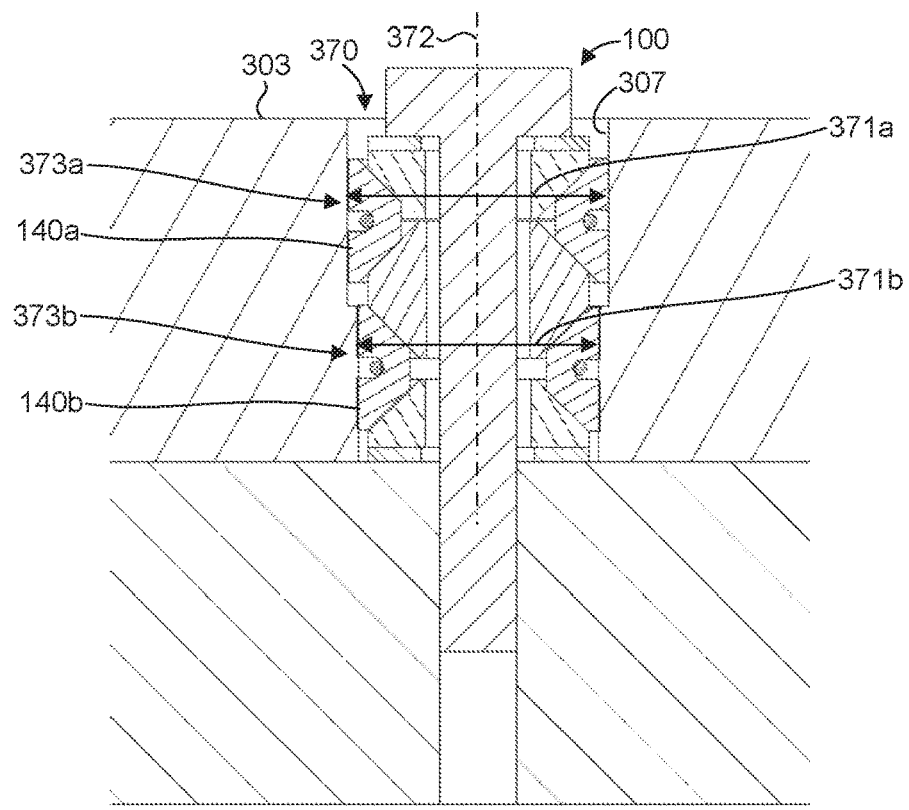
FIG. 8 is an illustration of the radial expansion coupling device of FIG. 1 coupling with a component having a stepped clearance hole, in accordance with an example of the present disclosure.

In one aspect, the radial expansion coupling device 100 can fit into misshaped or irregular clearance holes (e.g., holes without a straight or constant surface profile) without deforming either component. For example, as illustrated in FIG. 8, the radial expansion coupling device 100 can engage or couple with an interior portion 307 of a component 303 that defines an attachment opening 370 or clearance hole. The attachment opening 370 or clearance hole can have a diameter (indicated at 371a, 371b) that varies along an axis 372 (e.g., an attachment opening axis) of the attachment opening 370 or clearance hole. In this case, the interior portion 307 defines an attachment opening or clearance hole with a stepped configuration. The expansion wedge 140a can be engaged with the interior portion 307 at one region 373a of the attachment opening 370 along the attachment opening axis 372. The expansion wedge 140b can be engaged with the interior portion 307 at another region 373b of the attachment opening 370 along the attachment opening axis 372. The region 373a and the region 373b have different diameters 371a, 371b, respectively. The expansion wedges 140a, 140b can displace as needed in order to seat against the interior portion 307 in the respective regions 373a, 373b of the attachment opening 370.

Figure 9:
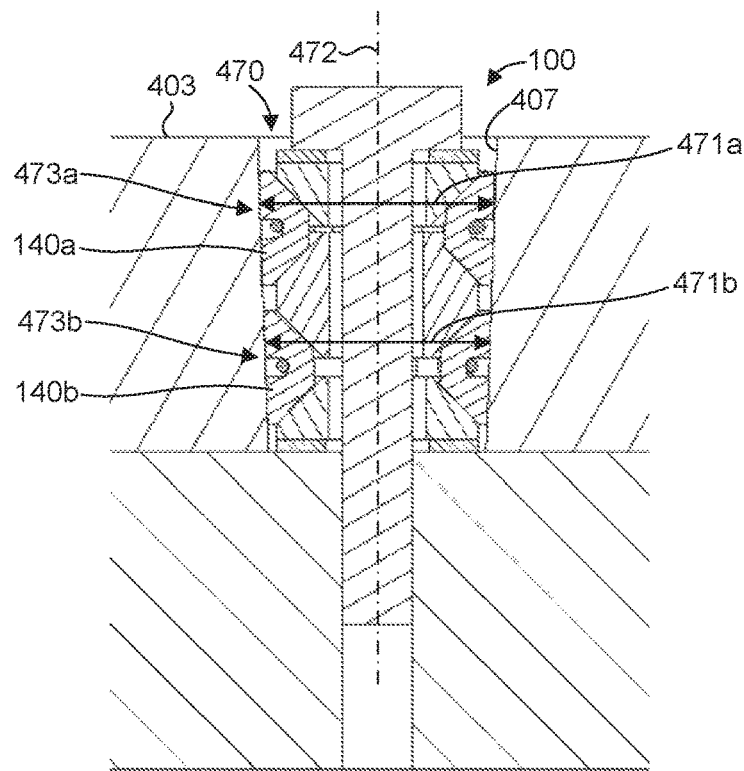
FIG. 9 is an illustration of the radial expansion coupling device of FIG. 1 with a component having a tapered clearance hole, in accordance with an example of the present disclosure.

Similarly, as illustrated in FIG. 9, the radial expansion coupling device 100 can engage or couple with an interior portion 407 of a component 403 that defines an attachment opening 470 or clearance hole with a tapered configuration. A diameter (indicated at 471a, 471b) varies along an axis 472 (e.g., an attachment opening axis) of the attachment opening 470 or clearance hole. The expansion wedge 140a can be engaged with the interior portion 407 at one region 473a of the attachment opening 470 along the attachment opening axis 472. The expansion wedge 140b can be engaged with the interior portion 407 at another region 473b of the attachment opening 470 along the attachment opening axis 472. The region 473a and the region 473b have different diameters 471a, 471b, respectively. The expansion wedges 140a, 140b can displace as needed in order to seat against the interior portion 407 in the respective regions 473a, 473b of the attachment opening 470.

Although two examples have been provided showing variable diameter or irregular attachment openings or clearance holes, it should be recognized that a radial expansion coupling device as disclosed herein can be adapted to engage a wide variety of opening or hole shapes or configurations.

Figure 10:
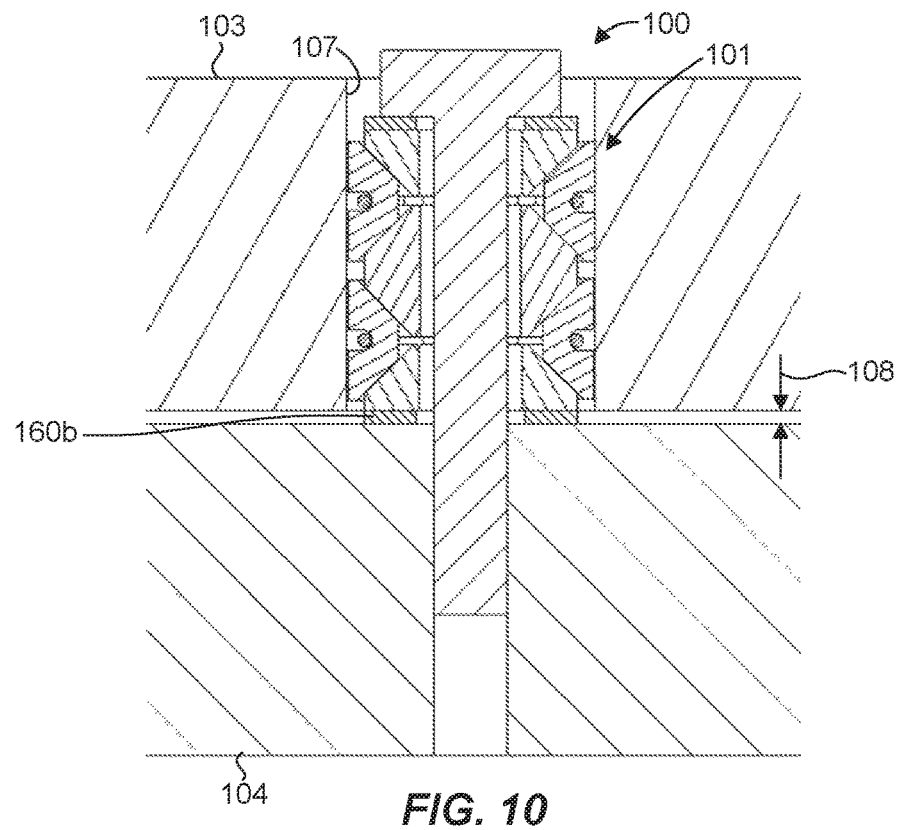
FIG. 10 is an illustration of the radial expansion coupling device of FIG. 1 coupling components such that the components are spaced apart from one another, in accordance with an example of the present disclosure.

In one aspect, illustrated in FIGS. 3 and 7-9, the radial expansion coupling device 100 can couple components such that the components are in direct physical contact with one another. In another aspect, shown in FIG. 10, the radial expansion coupling device 100 can couple the components 103, 104 such that the components 103, 104 are not in direct physical contact with one another. In this case, the radial expansion system 101 can engage the interior portion 107 of the component 103 such that the components 103, 104 are separated by a gap or distance 108. As illustrated, the gap or distance 108 corresponds to a thickness of the washer or spacer 160b, although this need not always be the case as the radial expansion system 101 can engage the interior portion 107 of the component 103 in any location to provide any suitable gap or distance 108 between the components 103, 104.

Figure 11:
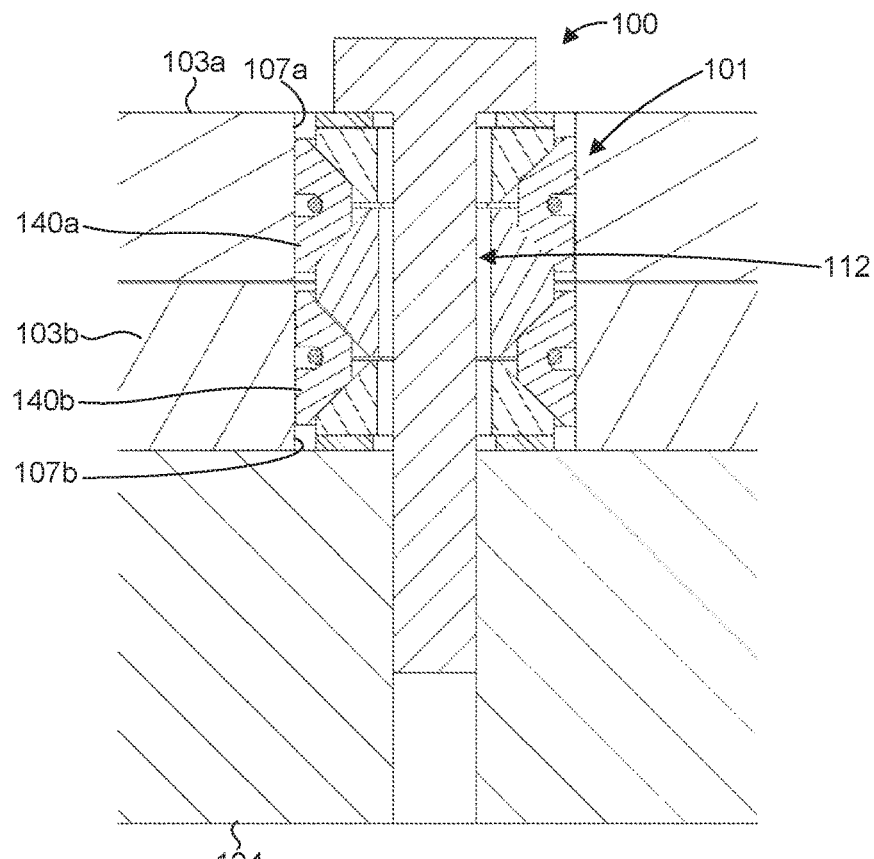
FIG. 11 is an illustration of the radial expansion coupling device of FIG. 1 coupling three components to one another, in accordance with an example of the present disclosure.

In one aspect, the radial expansion coupling device 100 can be utilized to couple more than two components to one another. For example, FIG. 11 shows the radial expansion coupling device 100 coupling three components 103a, 103b, 104 to one another by engaging the radial expansion system 101 (e.g., the expansion wedges 140a, 140b) with the components 103a, 103b. In the illustrated example, clamping surfaces of some of the expansion wedges (e.g., the expansion wedges 140a) engage and apply a clamping force to an interior portion 107a of the component 103a, and clamping surfaces of some other of the expansion wedges (e.g., the expansion wedges 140a) engage and apply a clamping force to an interior portion 107b of the component 103b. Thus, the radial expansion coupling device 100 can be used to couple three or more components to one another, which may be misaligned in some manner, with a single device. It should be recognized that a size (e.g., a diameter) of the interior portions 107a, 107b (e.g., clearance holes) of the respective components 103a, 103b can be the same or different.

With further reference primarily to FIGS. 1-3, the springs 150a, 150b can be configured to provide a light preloading force on the respective expansion wedges 140a, 140b, which can easily be overcome to allow the expansion wedges 140a, 140b to seat against the component 103. The springs 150a, 150b can be configured to have a stiffness or spring rate such that significant moments in the radial expansion coupling device 100 are not generated as the displacement mechanism 110 applies axial loading (e.g., during "bolt-up"). Thus, the springs 150a, 150b can be soft enough (i.e., have low spring stiffness) sufficient to provide minimum resistance to the expansion wedges 140a, 140b as they are radially displaced, so as to not over-constrain the expansion wedges 140a, 140b and thus allow each of them to find its own seat.

In one aspect, a minimum acceptable spring rate of the springs 150a, 150b can be determined by selecting a spring rate that ensures that the radial expansion coupling device 100 (e.g., the expansion wedges 140a, 140b) will retract from the engaged configuration (FIG. 3) to the disengaged configuration (FIG. 2) with no axial preload applied by the displacement mechanism 110. In this case, a spring rate can be selected that provides a radial spring load in the disengaged configuration that is greater than a radial retraction load required to retract the radial expansion coupling device 100 from the engaged configuration to the disengaged configuration. The radial retraction load may depend on friction, angle of wedges, etc. A maximum acceptable spring rate of the springs 150a, 150b can be determined by ensuring that the expansion wedges 140a, 140b can find their lowest stress seats without generating moments that exceed design limitations as the displacement mechanism 110 applies axial loading. Thus, radial preload in the radial expansion coupling device 100 can be achieved with minimal spring resistance, and therefore without generating significant moments, as the expansion wedges 140a, 140b and the wedge guides 120a, 120b, 130 seat.

In one aspect, the springs 150a, 150b can be configured to provide enough deflection range to stretch at least to the maximum engagement diameter (e.g., with the expansion wedges 140a, 140b in contact with the interior portion 107 or clearance hole). As a guideline, a free diameter of the springs 150a, 150b can be about half the diameter of the springs 150a, 150b when in the disengaged configuration shown in FIG. 2. The springs 150a, 150b can also be configured to deflect in multiple degrees of freedom, not just radially outward, since the expansion wedges 140a, 140b may deflect relative to each other in axial translation, tilt, etc. as the expansion wedges 140a, 140b find their seats. In addition, the springs 150a, 150b can be configured with a small enough cross section to properly engage the spring seats 144 of the expansion wedges. Thus, a suitable spring may have a small free diameter, a low spring rate, and a large deflection range.

In one aspect, it should be recognized that the technology disclosed herein can be used as a clutch for misaligned shafts.

In accordance with one embodiment of the present invention, a method for facilitating coupling two components to one another is disclosed. The method can comprise providing a plurality of wedge guides, each wedge guide having at least one guide surface, the plurality of wedge guides being operable to be movably arranged along an axis with the guide surfaces of adjacent wedge guides opposing one another. The method can further comprise providing a plurality of expansion wedges, each expansion wedge having wedge surfaces configured to slidingly interface with the at least one guide surface, and a clamp surface operable to interface with an interior portion of a first component, the plurality of expansion wedges being operable to be disposed between adjacent wedge guides such that the wedge surfaces interface with the opposing guide surfaces. Additionally, the method can comprise facilitating drawing a second component and the plurality of wedge guides toward one another to cause the plurality of expansion wedges to displace radially outward from the axis such that the clamping surfaces engage and apply a clamping force to the interior portion of the first component, and thereby couple the first and second components to one another. It is noted that no specific order is required in this method, though generally in one embodiment, these method steps can be carried out sequentially.

In one aspect, facilitating drawing the second component and the plurality of wedge guides toward one another can comprise providing a displacement mechanism. In a particular aspect, the displacement mechanism can comprise a threaded fastener. In another aspect, facilitating drawing the second component and the plurality of wedge guides toward one another can comprise providing each wedge guide with a central opening operable to receive a portion of a displacement mechanism therethrough.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A radial expansion system for a fastener, comprising:
a plurality of wedge guides comprising two end wedge guides and at least one intermediate wedge guide, each wedge guide having at least one guide surface, the plurality of wedge guides being operable to be movably arranged along an axis with the guide surfaces of adjacent wedge guides opposing one another, wherein the at least one intermediate wedge guide has guide surfaces configured to oppose the guide surfaces of wedge guides disposed on opposite sides of the intermediate wedge guide, the guide surfaces of the at least one intermediate wedge guide being oriented non-perpendicular to the axis;
a plurality of expansion wedges, each expansion wedge having wedge surfaces configured to slidingly interface with the at least one guide surface, and a clamp surface operable to interface with an interior portion of a first component, the plurality of expansion wedges being operable to be disposed between adjacent wedge guides such that the wedge surfaces interface with the opposing guide surfaces; and
at least one spring operable to bias at least one of the plurality of expansion wedges radially inward toward the axis,
wherein a second component and the plurality of wedge guides are operable to be drawn toward one another by a fastener to cause the plurality of expansion wedges to displace radially outward from the axis such that the clamping surfaces engage and apply a clamping force to the interior portion of the first component, and thereby couple the first and second components to one another.

2. The radial expansion system of claim 1, wherein each end wedge guide includes an outer interface surface configured to facilitate engagement with the fastener, the second component, or both.

3. The radial expansion system of claim 2, wherein the outer interface surface comprises a planar configuration.

4. The radial expansion system of claim 1, wherein the at least one spring comprises a garter spring, an elastic band, or a combination thereof.

5. The radial expansion system of claim 1, wherein the at least one of the plurality of expansion wedges comprises a spring seat configured to interface with the at least one spring and maintain the at least one spring proximate the at least one of the plurality of expansion wedges.

6. The radial expansion system of claim 1, wherein the plurality of wedge guides comprises three wedge guides.

7. The radial expansion system of claim 1, wherein the at least one guide surface comprises a plurality of guide surfaces separated from one another by one or more guide walls.

8. The radial expansion system of claim 7, wherein the one or more guide walls are radially oriented relative to the axis.

9. The radial expansion system of claim 1, wherein each wedge guide comprises a central opening operable to receive the fastener therethrough.

10. A radial expansion coupling system, comprising:
first and second components; and
a radial expansion coupling device operably coupling the first and second components to one another, the radial expansion coupling device comprising:
a displacement mechanism, and
a radial expansion system, having
a plurality of wedge guides comprising two end wedge guides and at least one intermediate wedge guide, each wedge guide having at least one guide surface, the plurality of wedge guides being movably arranged along an axis with the guide surfaces of adjacent wedge guides opposing one another, wherein the at least one intermediate wedge guide has guide surfaces configured to oppose the guide surfaces of wedge guides disposed on opposite sides of the intermediate wedge guide, the guide surfaces of the at least one intermediate wedge guide being oriented non-perpendicular to the axis,
a plurality of expansion wedges, each expansion wedge having wedge surfaces configured to slidingly interface with the at least one guide surface, and a clamp surface operable to interface with an interior portion of the first component, the plurality of expansion wedges being disposed between adjacent wedge guides such that the wedge surfaces interface with the opposing guide surfaces, and
at least one spring operable to bias at least one of the plurality of expansion wedges radially inward toward the axis, wherein the displacement mechanism is operable to draw the second component and the plurality of wedge guides toward one another to cause the plurality of expansion wedges to displace radially outward from the axis, the clamping surfaces engaging and applying a clamping force to the interior portion of the first component, thereby coupling the first and second components to one another.

11. The system of claim 10, wherein the first and second components are in direct physical contact with one another.

12. The system of claim 10, wherein the interior portion of the first component defines an attachment opening with a diameter that varies along an attachment opening axis.

13. The system of claim 12, wherein a first expansion wedge of the plurality of expansion wedges is engaged with the interior portion at a first region of the attachment opening along the attachment opening axis, and a second expansion wedge of the plurality of expansion wedges is engaged with the interior portion at a second region of the attachment opening along the attachment opening axis, the first and second regions of the attachment opening having different diameters.

14. The system of claim 10, further comprising a third component coupled to the first and second components by the radial expansion fastener, wherein the clamping surfaces of some of the plurality of expansion wedges engage and apply a clamping force to an interior portion of the third component.

15. The system of claim 10, wherein the displacement mechanism comprises a head, and an elongate body extending from the head.

16. The system of claim 15, wherein each wedge guide comprises a central opening receiving the elongate body therethrough.

17. The system of claim 10, wherein the displacement mechanism comprises a screw thread coupling the displacement mechanism to the second component.

18. The system of claim 10, wherein the displacement mechanism comprises a threaded fastener.

19. The system of claim 18, wherein the threaded fastener comprises a bolt, a screw, a nut, or a combination thereof.

20. A method for facilitating coupling two components to one another, the method comprising:
providing a plurality of wedge guides comprising two end wedge guides and at least one intermediate wedge guide, each wedge guide having at least one guide surface, the plurality of wedge guides being operable to be movably arranged along an axis with the guide surfaces of adjacent wedge guides opposing one another, wherein the at least one intermediate wedge guide has guide surfaces configured to oppose the guide surfaces of wedge guides disposed on opposite sides of the intermediate wedge guide, the guide surfaces of the at least one intermediate wedge guide being oriented non-perpendicular to the axis;
providing a plurality of expansion wedges, each expansion wedge having wedge surfaces configured to slidingly interface with the at least one guide surface, and a clamp surface operable to interface with an interior portion of a first component, the plurality of expansion wedges being operable to be disposed between adjacent wedge guides such that the wedge surfaces interface with the opposing guide surfaces;
providing at least one spring operable to bias at least one of the plurality of expansion wedges radially inward toward the axis; and
facilitating drawing a second component and the plurality of wedge guides toward one another to cause the plurality of expansion wedges to displace radially outward from the axis such that the clamping surfaces engage and apply a clamping force to the interior portion of the first component, and thereby couple the first and second components to one another.

21. The method of claim 20, wherein facilitating drawing the second component and the plurality of wedge guides toward one another comprises providing a displacement mechanism.

22. The method of claim 21, wherein the displacement mechanism comprises a threaded fastener.

23. The method of claim 20, wherein facilitating drawing the second component and the plurality of wedge guides toward one another comprises providing each wedge guide with a central opening operable to receive a portion of a displacement mechanism therethrough.

24. A radial expansion system for a fastener, comprising:
a plurality of wedge guides comprising two end wedge guides and at least one intermediate wedge guide, each wedge guide having a plurality of guide surfaces separated from one another by one or more guide walls, the plurality of wedge guides being operable to be movably arranged along an axis with the guide surfaces of adjacent wedge guides opposing one another, wherein the at least one intermediate wedge guide comprising guide surfaces configured to oppose guide surfaces of wedge guides disposed on opposite sides of the intermediate wedge guide, the guide surfaces of the at least one intermediate wedge guide being oriented non-perpendicular to the axis; and
a plurality of expansion wedges, each expansion wedge having wedge surfaces configured to slidingly interface with respective guide surfaces of the plurality of guide surfaces, and a clamp surface operable to interface with an interior portion of a first component, the plurality of expansion wedges operable to be disposed between adjacent wedge guides such that the wedge surfaces interface with the opposing guide surfaces,
wherein a second component and the plurality of wedge guides are operable to be drawn toward one another by a fastener to cause the plurality of expansion wedges to displace radially outward from the axis such that the clamping surfaces engage and apply a clamping force to the interior portion of the first component, and thereby couple the first and second components to one another.

25. A radial expansion coupling system, comprising:
first and second components, the first component comprising an interior portion defining an attachment opening with a diameter that varies along an attachment opening axis; and
a radial expansion coupling device operably coupling the first and second components to one another, the radial expansion coupling device comprising:
a displacement mechanism, and
a radial expansion system, having
a plurality of wedge guides comprising two end wedge guides and at least one intermediate wedge guide, each wedge guide having at least one guide surface, the plurality of wedge guides being movably arranged along an axis with the guide surfaces of adjacent wedge guides opposing one another, wherein the at least one intermediate wedge guide has guide surfaces configured to oppose the guide surfaces of wedge guides disposed on opposite sides of the intermediate wedge guide, the guide surfaces of the at least one intermediate wedge guide being oriented non-perpendicular to the axis, a plurality of expansion wedges, each expansion wedge having wedge surfaces configured to slidingly interface with the at least one guide surface, and a clamp surface operable to interface with the interior portion of the first component, the plurality of expansion wedges being disposed between adjacent wedge guides such that the wedge surfaces interface with the opposing guide surfaces, wherein the displacement mechanism is operable to draw the second component and the plurality of wedge guides toward one another to cause the plurality of expansion wedges to displace radially outward from the axis, the clamping surfaces engaging and applying a clamping force to the interior portion of the first component, thereby coupling the first and second components to one another.

26. The system of claim 25, wherein a first expansion wedge of the plurality of expansion wedges is engaged with the interior portion at a first region of the attachment opening along the attachment opening axis, and a second expansion wedge of the plurality of expansion wedges is engaged with the interior portion at a second region of the attachment opening along the attachment opening axis, the first and second regions of the attachment opening having different diameters.

* * * * *